Figure 1:
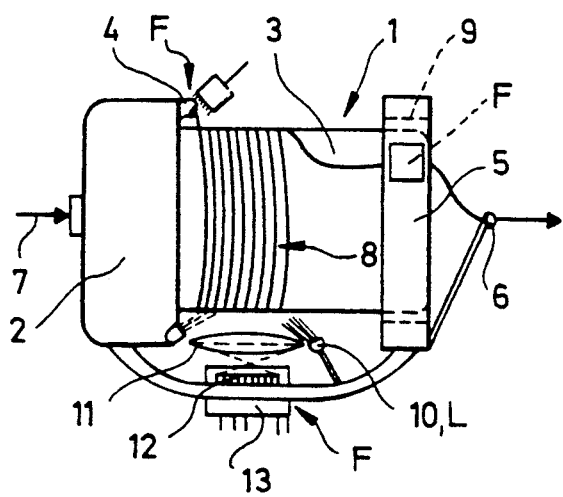

United States Patent [19]

Akerlind et al.

[11] Patent Number: 5,221,960
[45] Date of Patent: Jun. 22, 1993

[54] OPTO-ELECTRONIC DETECTOR APPARATUS

[75] Inventors: Bo Akerlind, Älvsjö; Jerker Hellström, Nol; Lars-Berno Fredriksson, Kinna, all of Sweden

[73] Assignee: Iro AB, Ulricehamn, Sweden

[21] Appl. No.: 741,469

[22] PCT Filed: Dec. 7, 1989

[86] PCT No.: PCT/EP89/01501
§ 371 Date: Aug. 2, 1991
§ 102(e) Date: Aug. 2, 1991

[87] PCT Pub. No.: WO90/06504
PCT Pub. Date: Jun. 14, 1990

[30] Foreign Application Priority Data

Dec. 7, 1988 [SE] Sweden .............. 88044417
Dec. 8, 1988 [SE] Sweden .............. 88044425
Jan. 9, 1989 [SE] Sweden .............. 89000475

[51] Int. Cl.⁵ .............................. G01N 21/84
[52] U.S. Cl. .............................. 356/429; 250/561; 250/571
[58] Field of Search .......... 250/561, 571, 572; 356/238, 429, 430, 431

[56] References Cited

U.S. PATENT DOCUMENTS

| | | | |
|---|---|---|---|
| 3,853,408 | 12/1974 | Kaalverink | 250/571 X |
| 4,300,599 | 11/1981 | Wueger | 250/571 X |
| 4,378,161 | 3/1983 | Maddox | 356/430 |

FOREIGN PATENT DOCUMENTS 0162134 11/1985 European Pat. Off. .
0188760 10/1986 European Pat. Off. .
0271728 6/1988 European Pat. Off. .

*Primary Examiner*—Vincent P. McGraw
*Attorney, Agent, or Firm*—Flynn, Thiel, Boutell & Tanis

[57] ABSTRACT

In an opto-electronic detector apparatus, particularly of a yarn storage and feeder apparatus, for detecting at least one yarn or yarn section moving transversely of its longitudinal direction in a detection field, said apparatus comprising a light source, a receiver surface, a photoelectric cell for generating an output signal, and an optical system, the optical system is an optical imaging system (A) having a focus depth defining a predetermined depth (T) of said detection field, and a field of vision of limited dimensions at least in the direction of its width (B), the receiver surface (16) being disposed in the vicinity of the focal plane of the optical imaging system (A), so that said imaging system (A) produced a clear image on the receiver surface (16).

26 Claims, 2 Drawing Sheets

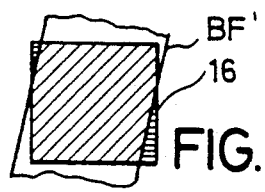
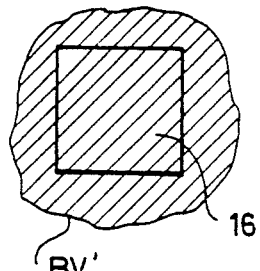
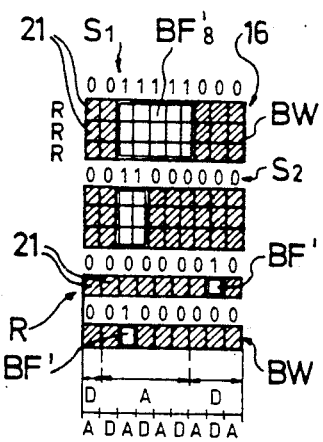
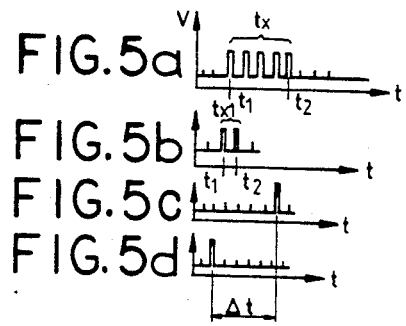
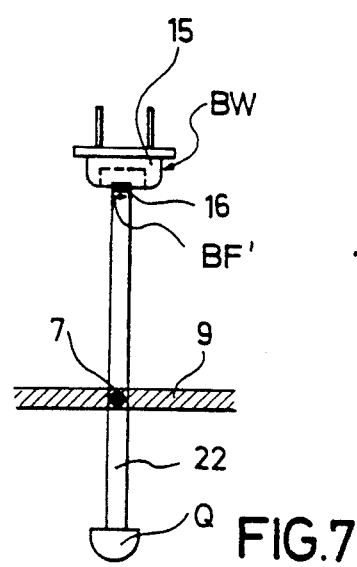
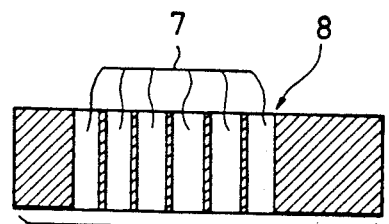
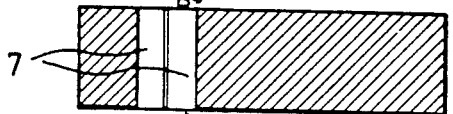
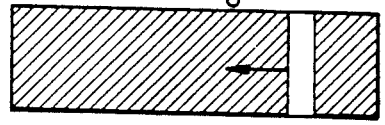
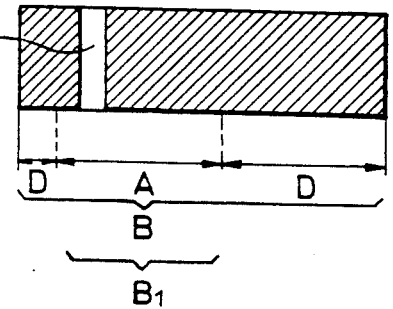

OPTO-ELECTRONIC DETECTOR APPARATUS

DESCRIPTION

This invention relates to an opto-electronic yarn detector apparatus.

An opto-electronic yarn detector in prior public use for detecting the passage of a yarn in an annular gap of a yarn storage and feeder device comprises a light source in the form of a light-emitting diode, and a receiver in the form of a photodiode or a phototransistor. A collective lens disposed opposite the receiver surface is designed to focus parallel light beams and views of a cylindrical detection field of infinite depth. The focus of the collective lens on the side of the yarn is located at infinity. The receiver or detector is set to a threshold value. A predetermined change of the brightness on the receiver surface results in the generation of a working signal, the light emitted, for example reflected, by the respective object in the detection field being uniformly distributed over the receiver surface. The working signals are extremely weak, requiring extensive measures to be taken for their amplification and noise suppression so as to permit the signals to be further processed. In view of the high yarn speeds in modern textile machinery, detector devices of this type are only of limited usefulness. They are particularly affected by extraneous light effects and contamination. A grave disadvantage is the tendency to produce false signals in response to the presence of fluff or lint tufts, because the apparatus is incapable of recognizing the difference between the yarn and such foreign matter, even when the latter reflects the light less strongly than the yarn. This is because a small amount of foreign matter at a small distance and a greater amount of foreign matter at a greater distance reflect the same amount of light as a yarn located at the proper distance.

U.S. Pat. No. 3,401,267 discloses an opto-electronic yarn detector for warp yarns in a weaving machine, in which the depth of the cylindrical detection field is equal to the width of the woven fabric. Light reflected by a warp yarn or by a greater amount of foreign matter is concentrated by a collective lens and uniformly distributed on the receiver surface. The working signal is generated when the light is of sufficient brightness.

Yarn detectors which are known from U.S. Pat. No. 4,300,599, U.S. Pat. No. 3,853,408 and U.S. Pat. No. 4,378,161 operate in the same way in principle. As the yarn passes the working signal in these yarn detectors is derived only from differences in brightness on the receiver surface.

The weakness of the working signal and the susceptabiilty to the presence of foreign matter result in these yarn detectors from the principle of viewing an excessively deep detection field virtually extending to infinity, and of generating signals on the basis of brightness variations on the receiver surface, a threshold value being used as a basis here.

In an apparatus as known from EP-A3-0 188 760 an object line, e.g. a bar code, on a moving material web is scanned by means of an imaging optics and the information contained in the object line is determined.

In accordance with EP-A-3-0 162 134, two-dimensional strips of the woven fabric are continuously scanned in a weaving machine by means of a moving scanning head to detect texture defects. An optics suitable for this purpose is provided on the side of the detector. To obtain information from each strip, the luminosity value on a scanning line is evaluated.

The method known from EP-A2-0 271 728 for measuring and/or monitoring yarn characteristics comprises the step of taking with the help of an image sensor the instantaneous picture of a yarn section and converting the latter to detect either thickness, circularity, twisting, projecting fibers or extension. The stationary yarn is examined, or when the latter moves in longitudinal direction, either an instantaneous picture is taken, or a stroboscope is used for obtaining a series of pictures, and the pictures are converted.

In the three last-mentioned cases the information that can be taken from the image of the present object is determined. The object is assumed to be present but the image of the object is not formed to derive a working signal from the passage, or the presence or absence of the object.

It is an object of the invention to provide an opto-electronic detector apparatus of a yarn storage and feeder device, which should be capable of generating strong and unmistakable working signals not susceptible to the influence of noise.

The sharp image of the yarn formed on the receiver surface is a pronounced and high contrast image which clearly differs from the image gained when the yarn is absent.

In the evaluation process, this results in a strong working signal which clearly deviates from the basic signal when the yarn is absent. The image of any fluffs in the detection field, which cannot be avoided in the working with yarns in a yarn storage and feeder device, that results on the receiver surface when the imaging optics is employed differs from the image of the yarn, which may be considered in the evaluation process and, therefore, it is possible to differentiate between the yarn and the fluffs and suppress the generation of a "false" working signal.

As the imaging optics ignores fluffs in front of or behind the detection field as a result of the depth of focus being set to the detection field, "false" working signals can be also avoided then.

Figure 3:
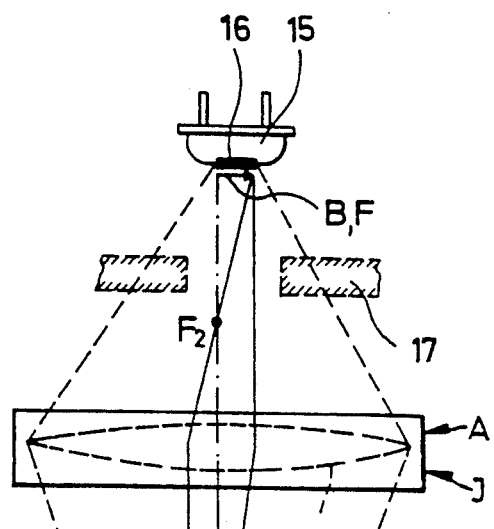
Figure 2:
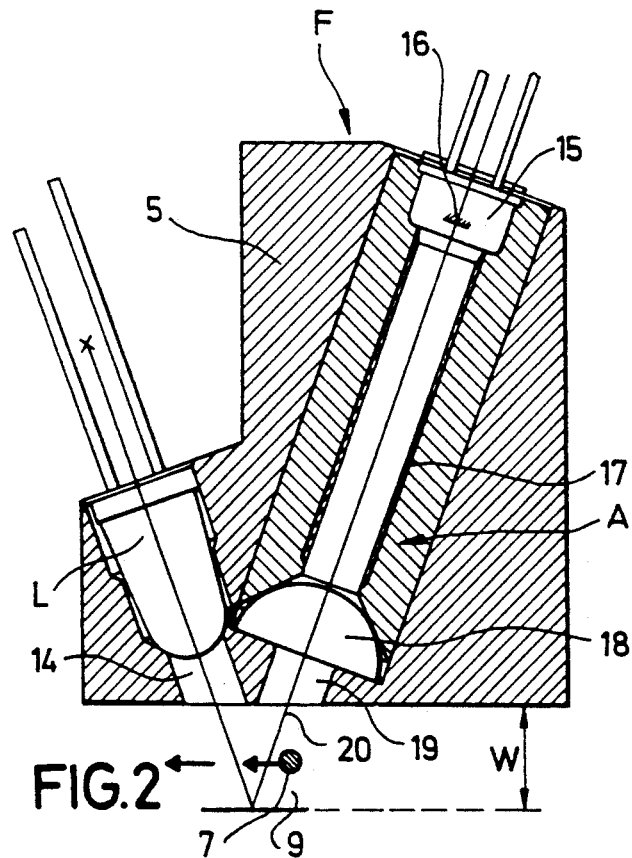

Embodiment of the subject matter of the invention shall now be described by way of example with reference to the accompanying drawings, wherein:

FIG. 1 shows a diagrammatical sideview of a yarn storage and feeder apparatus illustrating various applications of opto-electronic detector apparatuses, FIG. 2 shows an enlarged sectional view of a detector apparatus, FIG. 3 shows a diagrammatic illustration of components of a detector apparatus including an image converter, FIGS. 4A, 4B show two operative phases of the detector apparatus of FIG. 2, FIGS. 5a–d show four possibilities of the configuration of the image converter of the detector apparatus, FIG. 6 shows four diagrammatic illustrations for explaining the functions of the embodiments of FIG. 5, and FIG. 7 shows a diagrammatical illustration of another embodiment of a detector apparatus.

A yarn storage and feeder apparatus 1 depicted in FIG. 1 is equipped with three detector devices F for performing different functions. Apparatus 1 comprises a winding element 4 rotated by a drive mechanism 2 for winding a yarn 7 supplied thereto through drive mechanism 2 onto a storage surface 3 to form a yarn supply 8 consisting of several windings thereon. Yarn 7 is withdrawn from supply 8 in the axial direction through an annular gap 9 defined by a ring 5, and through a yarn guide eyelet 6. An opto-electronic detector apparatus F located in ring 5 detects the passage of yarn 7 at a given location of each revolution and generates output signals which may for instance be used for calculating the length of the withdrawn yarn, the speed of the yarn, or for detecting a break of the yarn.

Another opto-electronic detector apparatus F associated to winding element 4 is used for detecting the regular passage of yarn 7 and the operating speed of winding element 4 or drive mechanism 2, respectively. This detector apparatus is also useful for indicating a yarn break when the output signal indicating the passage of the yearn fails to appear at a determined instant. This detector apparatus may either monitor the yarn 7 as it leaves winding element 4 to thereby detect an upstream yarn break and/or the winding speed or the number of windings, or the vicinity of at least the first yarn winding in supply 8 to thereby detect an upstream yarn break. In both cases detector apparatus F also serves for determining the linear advance of the yarn.

A third detector apparatus F is fixedly mounted on a support outside of storage surface 3 and directed onto yarn supply 8. It monitors a strip-shaped detection field in which the yarn windings appear as an elongate object which may be interrupted by voids. Light sources 10 illuminate the detection field so as to enable detector apparatus F to produce an image of the object on a light-sensitive receiver surface 12 with the aid of an objective including a collecting lens 11. An image converter 13 converts the image into a variety of output signals as will be explained. The three detector devices F represent a selection of numerous possible applications of detector devices of this kind. All of these detector devices are useful for the generation of output signals by scanning a plurality of yarns, a single yarn, or just a portion of a yarn, and can be employed in textile machines, for instance weaving looms, as well as in auxiliary equipment of a variety of textile machinery.

FIG. 2 shows a sectional view of the detector apparatus F mounted in ring 5. The light source L employs a light-emitting diode 10 emitting its light through an oblique passage 14 into annular gap 9 through which yarn 7 passes transversely of its longitudinal direction. The angles of the incident light and of the reflected light are both about 20°. A photosensitive element 15, for instance a photodiode or a phototransistor, having a receiver surface 16 is disposed at the end of an interiorly lined tube 17 acting as an aperture stop, and directed onto the illuminated yarn 7, the other end of tube 17 being provided with an optical imaging device, for instance a collecting lens 18. The optical axis 20 of collecting lens 18 is directed onto receiver surface 16 and onto yarn 7. Provided on the other side of optical imaging device 18 is a further aperture stop 19 in the form of a passage preferably lined with a light-absorbing material. The width W of annular gap 9 may for instance be 5 mm. The depth of focus of optical imaging device 18 is selected to correspond to this width, the detection field scanned by imaging device 18 being additionally limited in the transverse direction to correspond for instance to the width of yarn 7. The detection field is thus accurately defined both in its optical depth and in its width at least in the transverse direction.

When yarn 7 enters the detection field, optical imaging device 18 acts to produce a clear image of the yarn on receiver surface 16, this image being then converted into an output signal by photosensitive element 15.

As shown in FIG. 3, an optical imaging system A represented by an objective J produces an image BF' of yarn 7, illustrated as an arrow BF representing the object, on receiver surface 16. The focal points F1, F2 of objective J, in the present case shown to include at least a biconvex collecting lens 11, on the object side and the image side are located respectively between objective J and annular gap 9 and between objective J and receiver surface 16. The image of object BF is projected onto receiver surface 16 in an inverted alignment and with an adjustable enlargement or reduction, and converted into an output signal by photosensitive element 15. The detection field has a width B and a depth T corresponding to the depth of annular gap 9 or less. Stop apertures 19, 17 improve the definition of image BF' and concentrate the depth of focus in the detection field. Stop apertures 19, 17 additionally compensate image distortions otherwise possibly caused by distorting marginal portions of collecting lens 11.

As shown in FIG. 4a, the clearly defined image BF' covers nearly all of the receiver surface 16. Only the horizontally hatched corners lie outside the boundaries of image BF'. Photosensitive element 15 is designed as an image converter BW or combined with an image converter BW acting to evaluate the image within its boundaries and to generate an output signal, for instance a digital 1. Output signal 1 is only generated when image converter BW senses a determined light intensity of the image within its clearly defined boundaries as indicated by the compactly hatched square representing receiver surface 16 in the upper part of FIG. 4a.

In contrast to the above, and as shown in FIG. 4b, when a fluff or lint tuft enters the detection field, the image BV' thereof will have greater dimensions than the image BF'. Due to the greater light permeability of the lint tuft, however, the image BV' on receiver surface 16 has a reduced brightness. The image converter detects this reduced brightness and fails to generate a useful output signal S1, instead of which it generates a base signal S2 or another signal, for instance a digital 0.

As shown in FIG. 5, image converter BW can be composed of a plurality of photosensitive elements arranged in a row or in the shape of a matrix permitting the image to be scanned as effectively as possible. In the embodiment of FIGS. 5a and 5b, the receiver surface 16 associated to image converter BW is designed as a two-dimensional matrix composed of three rows R1, R2 and R3 of photosensitive point elements or pixels 21 and connected to a control circuit (not shown) operable to sequentially scan these rows, for instance from left to right. According to FIG. 5a, the image BF'$_8$ of the yarn supply 8 forms an elongate rectangle with non-illuminated pixels adjacent both of its longitudinal ends. The corresponding detection field of the width B has five windings of yarn 7 extending thereacross as shown in FIG. 6A, and spaced from one another by narrow voids. This arrangement results in the formation of the image BF'$_8$. During each scanning sequence image converter BW converts image BF'$_8$ to a digital signal train as shown to the right of FIG. 5a as a voltage vs. time diagram. The signal train is composed of five distinct signals with no distinct signals at both ends of the train. The instant designated t1 represents the beginning of yarn supply 8 in the scanning direction, the time period tx corresponds to the size of the yarn supply or to the number of windings, respectively, and t2 represents the end of the yarn supply. The signals t1, tx and t2 as well as the absolute values of the signals in the signal train are representative of the size of yarn supply 8 and of its location within the detection field.

The next or one of the next scanning passages shows yarn supply 8 to have been reduced to two windings, specifically from the righthand withdrawal end as shown in FIG. 6B. This results in that the image BF'8 shown in FIG. 5b is correspondingly smaller and covers a smaller number of pixels in the matrix of image converter BW. The signal train shown in the diagram to the right of FIG. 5b contains only tow distinct signals. Since the instant tw and time period tx1 are correspondingly different from the formerly detected values t2 and tx, respectively, it is possible to detect both the reduction of the size of the image and the direction of this reduction by a comparison of the respective signals, for instance in a microprocessor. Winding element 4 shown in FIG. 1 may be operated in response to the result of the comparison for again increasing the yarn supply 8. When the sequential scanning operation shows the yarn supply 8 to have increased beyond a determined size, drive mechanism (FIG. 1) is again stopped. In practical operation, the sequential scanning is usually employed for controlling the continuous operation of yarn winding element 4 at the proper speed. When it is no longer possible to compensate a reduction or increase of the size of image BF'8 scanned by the control circuit, as in the case of a malfunction, for instance a break of the yarn, the scanning signals will be used to generate a malfunction warning or a stop signal.

According to FIGS. 5c, d and 6C, D, a linear matrix R composed of pixel elements 21 is used for converting the speed and direction of displacement of yarn 7 extending across the width B of the detection field into corresponding output signals (time period dt and digital "ones"), from which the yarn speed or the length of the withdrawn or would yarn can be determined (in FIG. 1 by means of the detector apparatus F associated to winding element 4). The output signals are processed by a microprocessor and may additionally be used for generating a malfunction warning or a stop signal in the case of excessive irregularity or failure to appear.

The linear matrix R of pixel elements 21 (FIGS. 5c, d) could also be employed for monitoring the yarn supply 8. A two-dimensional matrix as shown in FIGS. 5a, b offers the advantage, however, of generating particularly distinct and strong signals and of avoiding the problems which might otherwise result from an even slightly inaccurate alignment of the optical axis of objective J with respect to receiver surface 16 or image converter BW, respectively.

A shown in FIGS. 5c and 5d, the displacement of the image BF' of yarn 7 between successive scanning cycles results in a signal train in which a single output signal representing the presence of image BF' appears at different point of time. The time difference dt is used for determining the speed and direction of the displacement. The correct presence of yarn 7 is detected at the same time, because fluff or other foreign bodies would result in the generation of readily recognizable different signals.

In FIG. 5d it is diagrammatically shown that only a limited length A of the linear array R of pixel elements 21 is active, while the portions indicated at D have been deactivated to thereby reduce the scanning length. The same reduction can also be accomplished in the case of the two-dimensional matrix shown in FIGS. 5a, b. The resolution of the scanning operation may further be modified by alternately activating and deactivating successive pixel elements 21 in a linear or two-dimensional matrix, suitably by means of an activation selector component in the control circuit of the matrix. In this manner it is possible to reduce the width of the detection field to the width B1 shown in FIG. 6D, the adjacent areas D being ignored. It is also possible, however, to restrict the detection field by suitable adjustment of stop apertures 17, 19 or of the objective J of the optical imaging system 18.

In FIG. 7, a laser light source Q is employed for directing a beam of coherent light 22 through annular gap 9 and onto receiver surface 16. Due to the coherent light 22, the image BF' of yarn 7 is sufficiently clearly defined for its reliable evaluation by image converter BW, which may also be designed in the form of a two-dimensional or linear matrix.

Comparison of the functions of a detector apparatus according to FIGS. 2 and 3 and of a detector apparatus including a collecting lens without an accurately defined detection field:

Assumption: Yarn with a diameter of 0.4 mm and a light attenuation of 30%; fluff tuft with a diameter of 4 mm and a light attenuation of 6%. The size of receiver surface 16 is selected in correspondence to the diameter of yarn 7, so that the image produced by the optical imaging system 18 covers all of the receiver surface 16. The known detector apparatus includes a collecting lens and scans a cylindrical space having a diameter of 6 mm.

In the known detector apparatus, the cross-sectional area of the detection field is thus about 27 mm$^2$, while the area occupied by the yarn within the detection field is about 2.4 mm$^2$. This results in a modulation of about 2.6% in the case of the yarn. The fluff tuft occupies an area of about 12 mm$^2$, resulting in a modulation of likewise 2.6%. This shows that the fluff tuft results in the same light modulation as the yarn, although its light attenuation is only 1/5 of that of the yarn. The presence of the fluff tuft in the detection field thus causes the known detector apparatus to generate a false signal.

In the case of the present detector apparatus, the detection field is restricted to 0.13 mm$^2$, while the area occupied by the yarn in the detection field is likewise 0.13 mm$^2$, i.e. the yarn occupies the detection field completely, and its image covers all of the receiver surface. The light modulation of the yarn is 30%. A fluff tuft in the detection field is scanned over an area of only 0.13 mm$^2$, resulting in a light modulation of only 6%. This difference by the factor 5 enables the photosensitive element to discern between the yarn and the fluff tuft and to suppress the generation of a false signal.

We claim:

1. In a yarn detector apparatus of a yarn storage and feeder device for yarn which is moved transversely to its longitudinal direction through a detection field and whose presence in the detection field is intended to be detected, including a light source and a light-sensitive receiver surface which is associated with at least one photovoltaic cell generating a working signal when the yarn passes the detection field, and an optical system positioned between the light source and the receiver surface, the improvement comprising wherein said optical system includes imaging optics having a depth of focus at the side of a detection field to define a predetermined depth of the detection field, and having a field of vision which is restricted at least in width which approximately corresponds to the width of the yarn, and wherein said receiver surface is located within the sharp focus depth of said imaging optics.

2. Yarn detector apparatus according to claim 1, wherein the photovoltaic cell comprises a digital image converter for the sharp image on the receiver surface.

3. Yarn detector apparatus according to claim 1, wherein the width of the detection field is a predetermined degree greater than the width of the yarn.

4. Yarn detector apparatus according to claim 1, wherein the width of the receiver surface is a predetermined degree greater than the width of the image of the yarn.

5. Yarn detector apparatus according to claim 1, wherein the receiver surface is associated to a plurality of photovoltaic cells or light-sensitive elements arranged in a CCD detector arrangement to act as an image converter matrix, and connected to a control circuit for the sequential scanning of the matrix.

6. Yarn detector apparatus according to claim 1, including an image converter which includes the receiver surface, wherein the image converter has at least one photoelectric point element, and wherein the dimension of the photoelectric point element as viewed transversely to the yarn corresponds approximately to the dimension of the image in this direction.

7. Yarn detector apparatus according to claim 6, wherein the image converter comprises a linear or two-dimensional matrix of photoelectric point elements adapted to be scanned either individually or sequentially.

8. Yarn detector apparatus according to claim 7, wherein the matrix has a greater dimension in the scanning direction than the image.

9. Yarn detector apparatus according to claim 5, wherein the control circuit of the image converter includes a limiter component selectively operable to deactivate at least individual photoelectric point elements.

10. Yarn detector apparatus according to claim 1, including an image converter which includes the receiver surface, wherein the image converter permits the position of an imaging boundary on said receiver surface to be determined from the image, and an additional working signal representative of the position of the image on the receiver surface to be generated.

11. Yarn detector apparatus according to claim 1, including an image converter which includes the receiver surface, wherein the image converter permits displacements of the imaging boundaries over the receiver surface to be detected by sequential scanning, and to be converted into working signals representative of the respective speed of such displacement.

12. Yarn detector apparatus according to claim 1, wherein the imaging optics comprises an objective preferably including a collective lens.

13. Yarn detector apparatus according to claim 12, wherein said objective has at least one diaphragm or stop aperture disposed therein.

14. Yarn detector apparatus according to claim 12, wherein the objective includes a lens combination composed of a plurality of lenses inclusive of at least one collective lens.

15. Yarn detector apparatus according to claim 12, wherein the collective lens is a plano-convex, a biconvex or a meniscus lens.

16. Yarn detector apparatus according to claim 12, wherein the objective is adjustable for varying the depth of focus, the boundaries of the detection field and/or the imaging size.

17. Yarn detector apparatus according to claim 1, wherein the imaging optics contains a reflector component.

18. Yarn detector apparatus according to claim 1, wherein the imaging optics includes at least one stop aperture in the path of the light beam, the diameter of the stop aperture being smaller than the width of the detection field.

19. Yarn detector apparatus according to claim 1, wherein a diaphragm is adjustable or replaceable by another diaphragm having an aperture of different size.

20. Yarn detector apparatus according to claim 1, wherein the detection field is in the form of a part of an annular gap.

21. Yarn detector apparatus according to claim 20, wherein the part of the annular gap is provided between a storage surface and an outer ring of a yarn measuring component of the yarn storage and feeder device, and that the yarn detector apparatus is disposed in said ring.

22. Yarn detector apparatus according to claim 1, wherein for monitoring the yarn store provided on a storage surface of the yarn storage and feeder device the yarn detector apparatus is mounted on the device and is directed onto the storage surface from an outside location.

23. Yarn detector apparatus according to claim 1, wherein yarn detector apparatus is mounted on the yarn storage and feeder device at a stationary position relative to the rotatable winding element with which the yarn storage and feeder device is equipped, and is directed onto the yarn leaving the outlet of the winding element, or onto the first yarn winding on the storage surface.

24. Yarn detector apparatus according to claim 1, wherein there is provided a coherent light source, for emitting a light beam through the detection field and onto the receiver surface to directly form the image on the receiver surface.

25. Yarn detector apparatus according to claim 1, wherein on the side of the yarn, the focus of the objective, or of the collective lens, respectively, is located between the objective and the detection field, and at most in said detection field.

26. In a yarn storage and feeder device which includes an optoelectronic yarn detector apparatus for yarn which is moved transversely to its longitudinal direction through a detection field and whose presence in the detection field is intended to be detected, said opto-electronic yarn detector including a light source and a light-sensitive receiver surface which is associated with at least one photovoltaic cell generating a working signal when the yarn passes the detection field, and an optical system positioned between the light source and the receiver surface, the improvement comprising wherein the optical system includes imaging optics having a depth of focus at the side of the detection field to define a predetermined depth of the detection field, and having a field of vision which is restricted at least in width which approximately corresponds to the width of the yarn, and wherein the receiver surface is located within the sharp focus depth of the imaging optics.

* * * * *